(12) United States Patent
Kaneko et al.

(10) Patent No.: US 6,665,488 B1
(45) Date of Patent: Dec. 16, 2003

(54) VIDEO SIGNAL PROCESSING APPARATUS

(75) Inventors: Masayasu Kaneko, Ibaraki (JP); Shoji Nemoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/439,406

(22) Filed: Nov. 11, 1999

(30) Foreign Application Priority Data

Nov. 12, 1998 (JP) .......................................... 10-322460
Dec. 1, 1998 (JP) .......................................... 10-342119

(51) Int. Cl.[7] .............................. H04N 5/91; H04N 7/00
(52) U.S. Cl. ...................................... 386/46; 386/126
(58) Field of Search ............................. 386/46, 1, 109, 386/111, 112, 27, 33, 34, 35, 40, 124, 125, 131, 92; 360/32; H04N 5/91, 7/00

(56) References Cited

U.S. PATENT DOCUMENTS 4,210,942 A    7/1980  Nakamura et al.
4,674,071 A  * 6/1987  Okumura et al.
5,168,397 A  * 12/1992 Iwamura et al.

FOREIGN PATENT DOCUMENTS

EP    0 718 825    6/1996
EP    0 768 661    4/1997

* cited by examiner

*Primary Examiner*—Robert Chevalier
(74) *Attorney, Agent, or Firm*—Frommer Lawrence & Haug LLP; William S. Frommer

(57) ABSTRACT

A recording format discriminating apparatus for use on a video tape recorder capable of reproducing a signal recorded on a recording medium in a digital recording format or an analog recording format by one and same head rotary system or a plurality of head rotary systems dedicated to analog recording and digital recording respectively. The apparatus comprises: an amplifier, having a capability of automatically controlling a gain of a signal reproduced by one of the head rotary systems, for amplifying the signal to a predetermined level; a first band extracting circuit for extracting a particular narrow frequency band from the amplified signal; a first comparator and detector for detecting by amplification an output of the first band extracting circuit and comparing the detected output with a first reference value; a second comparator and detector for integrating and holding the comparison result output of the first comparator and detector and then comparing the integrated output with a second reference value; and a recording format discriminating circuit for discriminating the recording format of the signal recorded on the recording medium from the comparison result output of the second comparator and detector.

18 Claims, 6 Drawing Sheets

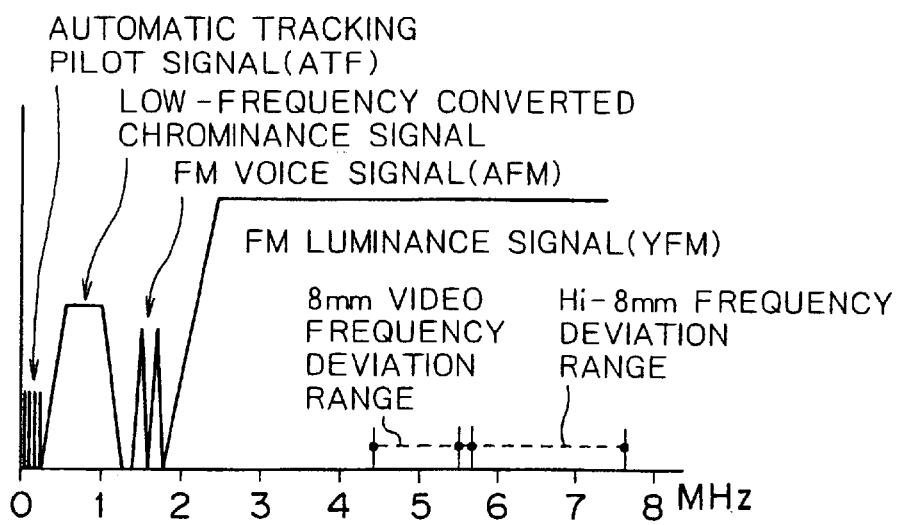
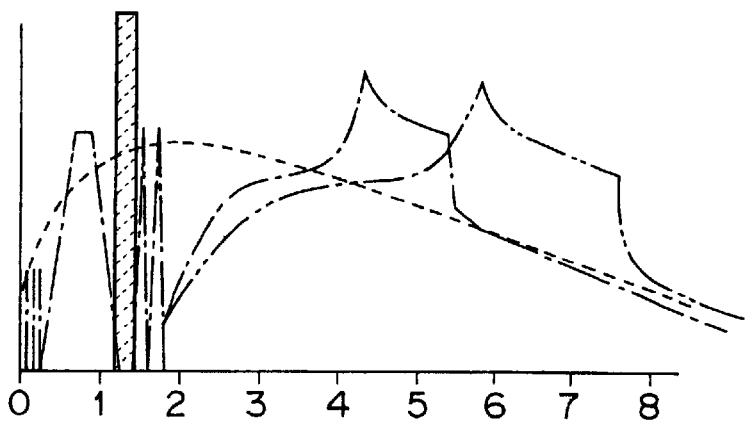
▨ DIGITAL/ANALOG FORMAT REPRODUCTION DISCRIMINATION
  FREQUENCY RANGE AT 8mm REPRODUCTION DRUM ROTATION
---- DIGITAL BAND CHARACTERISTIC
—— NORMAL 8mm BAND CHARACTERISTIC
—·— Hi-8mm BAND CHARACTERISTIC(YFM)

FIG. 4
| DETECT SIGNAL 1 | DETECT SIGNAL 2 | DECISION BY MICROCOMPUTER |
|---|---|---|
| 0 | 0 | UNRECORDED TAPE |
| 0 | 1 | ANALOG RECORDING (8mm FORMAT) |
| 1 | 0 | UNRECORDED TAPE |
| 1 | 1 | DIGITAL RECORDING |
FIG. 5A
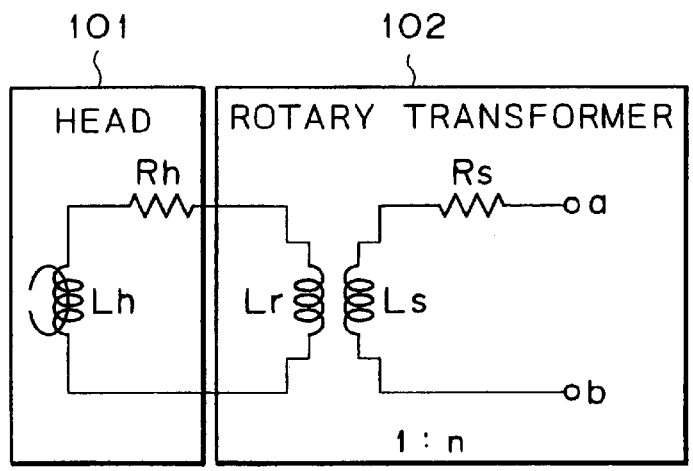
FIG. 5B
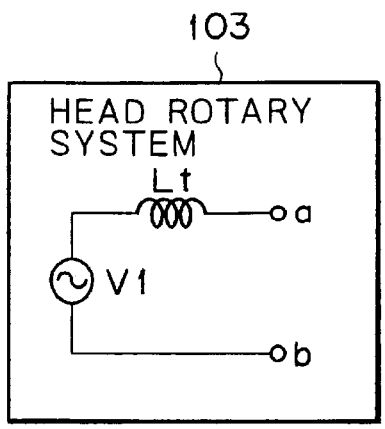

VIDEO SIGNAL PROCESSING APPARATUS

BACKGROUND OF THE INVENTION

The present invention relates generally to a video signal processing apparatus and, more particularly, to a recording format discriminating apparatus for use in a helical scan VTR device capable of discriminating between an analog recording format and a digital recording format of signals recorded on a recording medium.

With recent technological advances, it has become possible record and reproduce video signals on small-size recording media (or cassette) of a same shape, either in analog format or digital format. Consequently, configuring an 8 mm-format recording/reproducing apparatus such that changeover is made between drum rotational speeds and between capstan speeds to accomplish analog recording/reproduction and digital recording/reproduction with the same apparatus increases the merits of the apparatus. However, this requires to determine at reproduction whether a recording medium (or a cassette) is recorded in analog format or digital format to automatically select a drum rotational speed or capstan speed and a reproduction frequency band that match the detected recording format.

For discrimination of recording formats, a method is proposed in which the presence or absence of a spectrum point of an FM luminance signal (YFM) and a superimposed signal unique to the 8 mm and Hi-8 mm formats is determined. However, it is generally difficult to make the discrimination only by a particular spectrum point because, in digital format recording, a wide band spectrum is provided to effectively use the entire band of electromagnetic conversion system.

Conventionally, in the reproduction of a signal from a magnetic tape for example, the head and the rotary transformer of a recording/reproducing apparatus are made optimum in accordance with the signal format in electromagnetic conversion required for the reproduction of that signal.

Therefore, as with a wide-band digital signal and a narrow-band digital signal for example, when reproducing signals in electromagnetic conversion having different required band characteristics, the reproducing head and the rotary transformer dedicated to the format of each of digital and analog signals are used. It should be noted that the rotary transformer in this case is made multi-channel for each of the above-mentioned digital and analog signals.

SUMMARY OF THE INVENTION

As described, when a configuration in which both analog and digital recording/reproducing operations are enabled on a same video tape recorder (VTR) is considered, it is required to automatically discriminate at reproduction the recording format of a signal recorded on the recording medium.

It is therefore an object of the present invention to realize a recording format discriminating apparatus for use on VTRs that discriminates comparatively easily and reliably the recording format of a signal recorded on recording medium.

In carrying out the invention and according to one aspect thereof, there is provided a recording format discriminating apparatus for use on a video tape recorder capable of reproducing a signal recorded on a recording medium in a digital recording format or an analog recording format by one and same head rotary system or a plurality of head rotary systems dedicated to analog recording and digital recording respectively. The apparatus comprises: an amplifier, having a capability of automatically controlling a gain of a signal reproduced by one of the head rotary systems, for amplifying the signal to a predetermined level; a first band extracting circuit for extracting a particular narrow frequency band from the amplified signal; a first comparator and detector for detecting by amplification an output of the first band extracting circuit and comparing the detected output with a first reference value; a second comparator and detector for integrating and holding the comparison result output of the first comparator and detector and then comparing the integrated output with a second reference value; and a recording format discriminating circuit for discriminating the recording format of the signal recorded on the recording medium from the comparison result output of the second comparator and detector.

As described above, if, for the purpose of reproducing signals having different required band characteristics in electromagnetic conversion, a plurality of reproduction heads dedicated to these signals or multi-channel rotary transformers are disposed, the material and design costs increases and the scale of the circuit configuration grows. For example, if the reproduction heads dedicated to digital signal and analog signal and corresponding rotary transformers are disposed, the cost and the scale of configuration become twice or more as high as the configuration in which means are provided only for one signal format.

In addition, a digital recording/reproducing apparatus having upward compatibility (in this case, the upward capability is digital recording/reproducing) that allows only the reproduction of conventional analog signals while normally recording and reproducing digital signals is configured for example, the above-mentioned cost increase and the growth of configurational scale cause a significant burden for the manufacturer.

On the other hand, if signals having different required band characteristics in electromagnetic conversion are reproduced by use of one magnetic head and one rotary transformer, for example by use of a magnetic head and a rotary transformer each dedicated to a certain signal format, a signal having a different signal format is reproduced with a deteriorated C/N (carrier to noise) ratio. Obviously, use of a magnetic head and a rotary transformer optimized to no signal format deteriorates C/N at reproduction of any signal.

It is therefore another object of the present invention to provide a signal reproducing apparatus and a signal reproducing method for reproducing in a good condition (namely, with an improved C/N ratio) signals having different required band characteristics in electromagnetic conversion by use of one magnetic head and one rotary transformer and preventing the cost and configurational scale from being increased.

In carrying out the invention and according to another aspect thereof, there is provided a signal reproducing apparatus for at least reproducing signals having different band characteristics in electromagnetic conversion from a magnetic recording medium by use of one magnetic head and one rotary transformer, wherein a resonance frequency determined by an equivalent inductance and a resonance capacitance of the magnetic head and the rotary transformer is varied or selected according to formats of signals having different band characteristics in electromagnetic conversion.

According to the present invention, in the case where such signals in electromagnetic conversion having different required band characteristics as a digital signal and an analog signal for example are reproduced by use of one same magnetic head and one same rotary transformer, the C/N ratio and amplitude characteristics in each band can be optimized by varying or selecting resonance frequencies and damping quantities according to the signal formats of these signals.

BRIEF DESCRIPTION OF THE DRAWINGS

These and other objects of the invention will be seen by reference to the description, taken in connection with the accompanying drawing, in which:

FIG. 1 is a diagram illustrating a frequency allocation of (8 mm video) signals recorded in analog fashion;

FIG. 2 is a diagram illustrating a frequency allocation of analog and digital signals at reproduction drum rotational speeds of an 8 mm video;

FIG. 4 is a diagram illustrating the relationships among detection signals, the presence and absence of tape recorded signal, and format;

FIG. 5A is a circuit diagram illustrating a head and a rotary transformer;

FIG. 5B is a circuit diagram illustrating an equivalent circuit (a head rotary system) of the circuit shown in FIG. 5A;

DETAILED DESCRIPTION OF THE PREFERRED EMBODIMENTS

Figure 3:
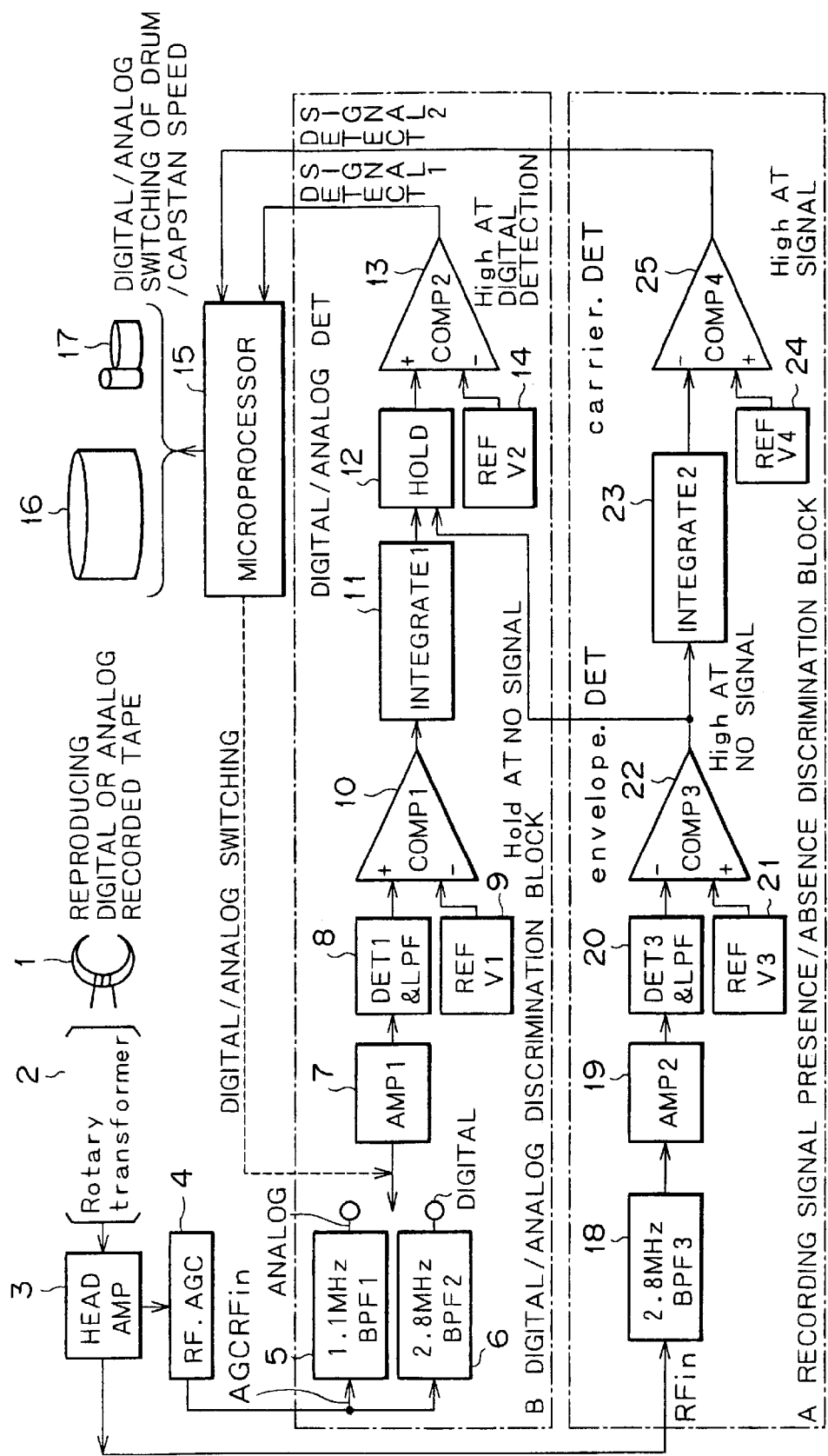
FIG. 3 is a block diagram illustrating the circuit of a recording format discriminating apparatus practiced as one preferred embodiment of the invention.

This invention will be described in further detail by way of example with reference to the accompanying drawings. First, the difference in the reproduction signal frequency allocation between a video signal recorded in analog fashion and a digitally recorded video signal will be described. An 8 mm format recording/reproducing apparatus configured to record and reproduce also a digital format signal by switching between the drum rotational speeds and the capstan speeds provides an advantage of allowing, also at digital recording, use of a small-size recording medium (or a cassette) without change and involving additional cost. However, this configuration requires to determine at reproduction whether the recording medium is recorded in analog 8 mm format or digital format. For reproduction, selection between these formats must be made manually or automatically.

The format of analog recording (for example, NTSC 8 mm video) is characterized by that the frequency allocation of multiplex signal is specified as shown in FIG. 1, providing a gap configuration in which the frequencies of multiplex signals do not overlap one another. Each band varies its occupied bandwidth according to information (video) as time passes but this format prevents the bands from overlapping one another in frequency allocation. On the other hand, the frequency spectrum of digital format recording is M-series randomized, being distributed over generally the entire band, changing infrequently in time.

FIG. 2 shows the aspects of the spectra of both analog recording and digital recording at 8 mm video reproduction drum rotational speeds in the case where the ratio of the drum speed at digital recording/reproduction to the drum speed at 8 mm video recording/reproduction is 2.5 times as high. As described before, a digital format signal is recorded in a scrambled form and its spectrum is recorded over a wide band without gap regardless of the information signal (video for example). On the other hand, an analog format signal frequency allocations such as video, voice, and tracking and gaps are provided to prevent each frequency band from overlapping one another (refer to FIGS. 1 and 2).

The presence or absence of the frequency component that provides the gap in the analog format is determined by comparing both signals. If a signal level is found in the gap, it may be determined that this is digital format recording; if not, it may be determined that this is analog format recording. As this gap frequency goes lower, it is more convenient for amplification and detection. At 8 mm reproduction drum rotational speeds, in the 8 mm format, the gap frequency is equivalent to the band of 1 to 1.4 MHz, a gap between low-frequency converted chrominance frequency band and AFM frequency band for voice signal (the hatched portion shown in FIG. 2). The level ratio between digital and analog in the neighborhood of 1.1 MHz of this gap portion is about 20 dB, which facilitates the discrimination by the detection with a narrow band filter.

At digital reproduction, if the drum rotational speed is 2.5 times as high as that at analog reproduction, only the aspect ratio becomes 2.5 times as high, band 2.5 to 3.5 MHz providing the gap for detection.

However, the above-mentioned detection method alone determines that an unrecorded tape is found having no gap frequency component and therefore this tape is recorded in analog fashion. Therefore, it is required to separately determine whether a reproduction tape is with signals recorded or not. For this determination, it is desirable to detect a signal of which level does not change by information at recording. In the 8 mm format, the output level of YFM (luminance signal) is high, corresponding to this signal of which level does not change. Mean carrier frequencies are 5 MHz in normal mode and 7 MHz in Hi-8 mode. However, at digital reproduction drum rotation, the rotational speed becomes 2.5 times as high, so that the aspect ratio expands to 2.5 times as high and the equivalent reproduction frequency becomes about 12.5 to 17.5 MHz (in 8 mm PAL, about 15 to 21 MHz).

Thus, the signal presence/absence detection by use of YFM changing over a wide band causes the problems as mentioned above. Consequently, at digital drum rotation, the detection is made in an equivalent reproduction band (3.5 MHz to 4.6 MHz) which is 2.5 times as high as the AFM signal (voice signal) 1.5 MHz always specified on 8 mm format. Detection by filter comparatively broadly around this equivalent reproduction band allows the detection of the YFM signal at 8 mm reproduction drum rotation and the AFM signal at digital drum rotation, thereby providing signal detection without especially involving filter switching.

The following describes the configuration and function of the recording format discriminating apparatus according to the invention with respect to FIG. 3. Now, assume that the drum rotational speed is in 8 mm reproduction mode. When a tape recorded in a digital fashion, an analog fashion, or a combined fashion by the spectrum described above is reproduced 8 mm reproduction speed, RF (Radio Frequency) reproduction output is obtained a rotary head 1. This RF reproduction output is amplified by a head amplifier (HEAD AMP) 3 up to a required level. The amplified signal is then supplied to a recording presence/absence discrimination block (for determining whether this tape is recorded with a signal) A and to a digital/analog (format) discrimination block B with the signal level made constant by an RF AGC (Automatic Gain Control) 4.

The signal inputted in the digital/analog discrimination block B is extracted only in its component through a narrow band filter BPF1 5 with the neighborhood of 1.1 MHz being the center. The resultant signal is then amplified by an AMP1 7 up to a detectable level to check the difference between digital and analog. The amplified signal is then detected by a DET1 8 to be processed by an LPF 8. The output signal of the DET1 & LPF 8 is then inputted in a differential comparator COMP1 10 at the "+" (plus) side to be compared with V1 of a reference voltage REF1 9 inputted at the "−" (minus) side. The reference signal REF1 9 is set higher than the "+" side input voltage at the time of no signal. At no-signal time, the comparison output of the differential comparator COMP1 10 is LOW. But, when the detection output over a certain level is inputted at the "+" side, the comparison output goes from LOW to HIGH.

When a digitally recorded tape is reproduced, a HIGH signal is obtained discretely and continuously. In order to remove instantaneous HIGH factors (for example, a low-frequency converted chrominance signal, instantaneous sideband expansion of AFM signal, and effects of equivalent reproduction frequency at starting and stop of drum rotation), the signal is integrated by an integrator INTEGRATE1 11 by use of a time constant of several 10 ms. The integrated signal is then inputted in a hold circuit 12.

This hold circuit 12 is inserted for the purpose that follows. Namely, if the tape travels in different reproduction modes in different formats, servo may be deactivated, resulting in incorrect tracking. In this case, the reproduction is made with different head azimuth angles, so that the RF reproduction output is obtained only once in every several fields, making continuous detection difficult. This phenomenon also occurs at variable-speed reproduction or, if the head is contaminated, at drum rotation starting or end time. Thus, if the RF reproduction drops remarkably, the integration value immediately before this phenomenon is held in the hold circuit 12 to facilitate the detection. The hold circuit 12 is turned on/off by a recording signal presence/absence discrimination block A to be described later.

The output signal of the hold circuit 12 is inputted in a differential comparator COMP2 13 at the "+" side to be compared with V2 voltage of a REF2 14 at the "−" side. In this example, if the output of the COMP1 10 denotes digital format, the output of the COMP2 13 also goes HIGH. This output provides detection signal 1, which is inputted in a microprocessor 15. The microprocessor 15 detects the state of this detection signal 1 and such a condition representing presence of data or the state in transmission outputted from the recording signal presence/absence discrimination block A as recording presence and status-in-transition. On the basis of the detection result, the microprocessor 15 switches the drum rotation and tape travel system to digital reproduction mode. The microprocessor 15 also switches the narrow band filter BPF1 5 in the digital/analog discrimination block B to a BPF2 6. The subsequent operation will be executed in generally the same manner.

Generally similar processing is executed also in the recording signal presence/absence discrimination block A.

In this block, the RF output including the level fluctuation obtained from the tape head 1 is used without change as the input signal for detection. The input signal is amplified by an AMP2 19 via a comparatively broad band filter BPF3 18 around neighborhood of 4.2 MHz.

Then, the amplified signal is detected by a DET3 20 and processed by an LPF 20. The resultant signal is then inputted in a differential comparator COMP3 22 at the "+" side. The LPF of the DET3 20 is set to a time constant so that the envelope of the level fluctuation of the RF output is obtained. For the comparison in the COMP3 22, voltage V3 of the REF3 21 is set so that a level drop mainly due to no-recording or at variable-speed reproduction can be detected. In the above-mentioned example, the output of the COMP3 22 goes LOW when the tape is recorded and HIGH when the tape is not recorded. This output signal is processed by an integrator INTEGRATE2 23 to move a large level fluctuation due to single channel head clog (contamination of head gap) or variable-speed reproduction. Then, the integrated signal is compared by a differential comparator COMP4 25 with voltage V4. The COMP4 25 output goes HIGH when the tape is recorded and LOW when the tape is not recorded. This output provides detection signal 2.

The microprocessor 15 determines the format recorded on this tape as shown in FIG. 4 from the detection signal 1 coming from the digital/analog discrimination block B and the detection signal 2 coming from the recording signal presence/absence discrimination block A. In the figure, in the detection signal 1 and the detection signal 2, "0" denotes LOW and "1" denotes HIGH. If the detection signal is "0", it indicates that the tape is not recorded and the current travel mode is kept unchanged. If the detection signal 2 is "1", the determination of the detection signal 1 is made valid, entering the travel mode suitable for the determined format reproduction.

Although not directly associated with the present invention, the following describes the digital/analog discrimination method used in related-art analog machines (8 mm video). If a digital recording format is newly recorded on a recording medium having the same shape (cassette) in addition to conventional analog recording, the digitally recorded portion of the tape cannot be reproduced by a conventional recording/reproducing apparatus. In this case, the tape counter operates (indicating that the tape is recorded), but, if no sync signal at the time of video signal reproduction is given, no reproduced image may be displayed. If this happens, this may be recognized as a machine trouble.

As described before, a digital recording signal is recorded as randomized in frequency. Therefore, if a digital recording signal is reproduced by a conventional analog VTR, it is observed as a noise screen (unless the reproduced video signal is muted). It is difficult for general users to determine whether this video is the reproduction noise of the unrecorded tape or the reproduction signal of digital recording.

However, if an unrecorded portion of time-series type is arranged in digital recording tape format equivalent to track, the portion corresponding to that unrecorded portion appears at the time of analog reproduction as a band-like noise different in aspect from other portions.

Since general-purpose VTRs have a capability of muting a reproduced screen when no video sync is obtained, generally it is impossible to confirm the above-mentioned features at the time of reproduction. However, these features can be confirmed with a variable-speed reproduced screen at the time of pause for example when a pseudo vertical sync signal is inserted for reproduction. Consequently, writing the method of confirming the above-mentioned band-shaped noise in instruction manuals for example can realize the discrimination between the digital recording and analog recording on a recorded tape by a conventional analog VTR.

Execution of the automatic analog/digital discrimination as described above eliminates the inconveniences encountered at the time of reproduction by devices for recording digital and analog signals on a same recording medium (8 mm cassette). Description of the method of discriminating between analog recording and digital recording on the reproduced screen of a recorded tape on conventional machines (8 mm reproducing machines) eliminates the troubles that may unnecessarily confuse users, thereby enhancing user-friendliness. The method of detecting through a narrow band filter the gap between the AFM frequency and the low-frequency converted chrominance frequency of 8 mm format is characterized by that a large signal level difference for the detection can be obtained, thereby facilitating the discrimination.

Digitally, the information about equivalent reproduction signal carrier obtained from the narrow band filter is obtained discretely and continuously at the time of drum starting in other than a drum constant running operation. With an 8 mm format signal, however, because of its isolated frequency allocation, the above-mentioned information can be obtained only discretely and instantaneously. In the present invention, this difference is detected by the above-mentioned integrator circuits, thereby allowing early analog/digital discrimination at the time of starting operations such as tape loading.

Figure 6:
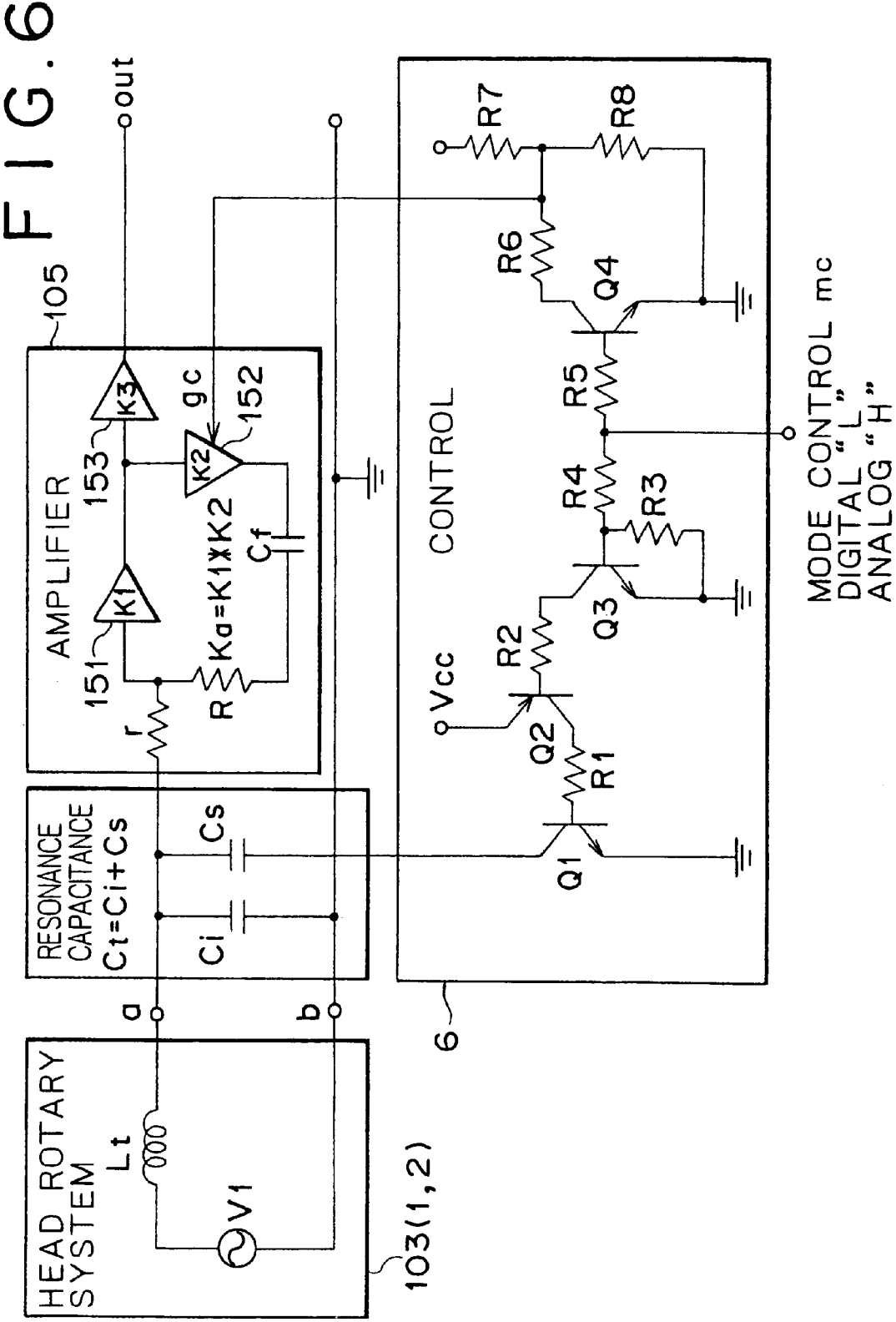
FIG. 6 is a circuit diagram illustrating one example of configuration equivalent to one channel with the output of the head rotary system unbalanced.

For the configurations of the main portion of a magnetic recording/reproducing apparatus to which the signal reproducing method and the signal reproducing apparatus associated with the present invention, FIG. 5A shows the configurations of a magnetic head 101 and a rotary transformer 102, FIG. 5B shows the configuration of a circuit equivalent to these head and transformer (hereafter referred to as a head rotary system 103), and FIG. 6 shows the configurations of these head 101 and rotary transformer 102 (and the head rotary system 103), the amplifier 105, a controller 106, a resonance capacitance (Ct), and so on.

The following describes the basic capabilities of the magnetic recording/reproducing apparatus practiced as one preferred embodiment of the invention with reference to FIGS. 5A, 5B, and 6. It should be noted that the specific operations of the magnetic recording/reproducing apparatus will be described later.

For example, if the recording wavelength is 0.49 μm, the band in electromagnetic conversion in the head rotary system 103 required at digital recording/reproducing requires 20 MHz or higher. On the other hand, the required band in the head rotary system 103 required at analog recording/reproducing is less than 10 MHz even at the tip of white clip in the case of a so-called high-band type 8 mm video format for example.

Head resonance frequency $\omega_0$ occurring in the transmission frequency characteristic of the head rotary system 103 is generally placed at the upper limit of the required band and damped so that C/N (carrier-to-noise) ratio and amplitude phase characteristic are optimized. Consequently, the transmission band of the head rotary system 103 is up to this resonance frequency $\omega_0$.

Further, let inductance (equivalent converted inductance) obtained as viewed from the entrance of the head amplifier 105 to the head rotary system 103 be Lt, inductance on the rotor side of the rotary transformer 102 be Lr, inductance on the stator side be Ls, turn ratio of the rotary transformer 102 be n, coupling coefficient be k, head inductance be Lh, total capacitance (resonance capacitance) including inputs of harness and amplifier 105 be Ct(Ct=Ci+Cs), and ignore approximate resistance component (Rh=Rs=0) for the sake of simplicity, then the head resonance frequency $\omega_0$ is obtained from the following relations:

$$Lt = n^2 * Lr\{1 - Lrk^2/(Lr+Lh)\}$$

$$\omega_0 = 1/\sqrt{(LtCt)}$$

If so-called 8 mm video is taken for example as a signal format, then the turn ratio of the rotary transformer is 2 to 5. If, for this 8 mm video format, the band is to be expanded (or digitized) twice or more as high in the turn ratio n for example, turn ratio becomes 2 to 3. It should be noted that the 2-to-3 turn ratio mentioned above is given because only an integer ratio is allowed as turn ratio. Further, if resonance capacitance Ct is improved, the head resonance frequency $\omega_0$ becomes about 2 times as high. In the system thus configured, the relative speed between tape and head is set 2 times or more as high as the speed at reproduction of a narrow-band signal (an analog signal) only at the time of a wide-band signal (a digital signal), a recording/reproducing apparatus for wide-band signals can be realized with ease.

However, in such a recording/reproducing apparatus, if a conventional narrow-band signal (an analog signal) for example is reproduced, the above-mentioned turn ratio n decreases to drop the level of the input signal to the amplifier 105 by about −4.4 dB as compared with conventional equivalent. Consequently, the effects of amplifier noise become large in the neighborhood of reproduction limit frequency to bring about disadvantages in C/N ratio, resulting in picture quality deterioration.

Now, let the feedback gain of the amplifier 105 be Ka and its input converted equivalent noise resistance be r, then the head rotary system 103 can be approximated as shown in FIG. 6. It should be noted that resistance R in the figure is used for damping the head resonance frequency by feedback.

Thus, the input converted total noise eth of this system becomes as shown in the following relation if measurement bandwidth is 1 Hz. It should be noted that Rh=Rs=0.

$$e^2_{th} = 4kT\{(1-\omega^2 LtCt)^2(r+r^2/R)+(\omega Lt)^2/R\}$$

It should be noted that k in the above-mentioned relation denotes Boltzmann's constant while T denotes absolute temperature. What enclosed in braces { } in the above-mentioned relation denotes the total resistance of input converted equivalent noise. The first term of the relation denotes a noise source from the amplifier 105. The second term denotes a noise source from the damping resistor R. Provided that input converted equivalent noise resistance r shown in FIG. 6 is not included in transmission function.

The above-mentioned relation indicates that the effect of the amplifier noise source is minimized at approximately head resonance frequency $\omega = \omega_0$. Namely, making the configuration such that the head resonance frequency is shifted according to wide-band signal (digital signal) or narrow-band signal (analog signal) effectively improves the C/N ratio in an intended reproduction limit frequency in respective reproduction band. It should be noted that the cost for this improvement small as indicated by the controller 106 shown in FIG. 6, the configuration thereof being detailed later.

The value of optimum damping resistor R for obtaining a good amplitude phase characteristic in transmission is given by the following relation.

$$R=(1+Ka)*\sqrt{(Lt/2Ct)}$$

In the above-mentioned relation, if feedback gain Ka of the amplifier 105 is zero, it indicates no feedback. However, as feedback gain Ka increases, a larger damping resistance value can be used. Also, the above-mentioned relation indicates that, as the resistance value of the damping resistor R increases, the C/N ratio can be improved more effectively.

When reproducing by the same head rotary system 103 the signals having different reproduction bands such as narrow-band signal (analog signal) and wide-band signal (digital signal), the C/N ratio improvement is executed by shifting the head resonance frequency by operating the above-mentioned resonance capacitance Ct. However, as the above-mentioned relation indicates, the C/N ratio involves a distortion unless the value of the damping resistor R providing optimum amplitude phase characteristic is changed.

But, because the damping resistor R is incorporated in the amplifier 105 (an integrated circuit IC), the value of the damping resistor R is fixed. On the other hand, even if the value of the damping resistor is fixed, operating the feedback gain Ka of the amplifier 105 according to the change in the resonance capacitor Ct indicates that the above-mentioned relation is established with ease. Namely, at the time of reproducing a narrow-band signal (analog signal), increasing the above-mentioned resonance capacitance Ct to lower the head resonance frequency and, at the same time, increasing the feedback gain Ka can optimize the amplitude phase characteristic. Obviously, in this case, the C/N ratio remains unchanged because the value of the damping resistor R is fixed.

As shown in FIG. 6, the optimum amplitude phase characteristic such as described above can be realized by controlling the resonance capacitance Ct and the feedback gain Ka by means of the controller 106.

The following describes the configuration shown in FIG. 6 in detail.

As shown in FIG. 6, a signal voltage induced on the head 101 when a magnetic tape for example is reproduced is multiplied by the rotary transformer 102 by n to provide V1. The signal having this signal voltage V1 passes a low-pass filter consisting of the equivalent conversion inductance Lt and the resonance capacitance Ct of the head rotary system 103 and enters the amplifier 105.

A so-called head resonance frequency caused by the above-mentioned low-pass filter is corrected in amplitude phase characteristic by a feedback loop consisting of the feedback gain Ka, the damping resistor R, and a capacitor Cf, the corrected signal being outputted through an amplifier 153 of a gain K3.

The feedback gain Ka is determined by a value obtained by multiplying gain K1 of an amplifier 151 by gain K2 of an inverted amplifier 152 (Ka=K1*K2) Gain K2 constituting the feedback gain Ka is controlled by a gain control signal gc coming from the controller 106. For example, as the voltage value of the gain control signal gc lowers, the gain K2 rises, or the feedback gain Ka rises.

The voltage value of the gain control signal gc is set by resistors R7, R8, and R6 in the controller 106. Whether the gain control signal gc with the voltage value thus set is to be supplied to the amplifier 152 in the amplifier 105 is controlled by turn-on/off of a transistor Q4.

The resonance capacitance Ct is determined by capacitors of Ci and Cs (Ct=Ci+Cs). Of Ci and Cs, Cs for example is additional capacitance that lowers the head resonance frequency, namely by increasing the resonance capacitance Ct.

Whether this additional capacitance Cs is to be used or not is controlled by transistor Q1 and resistor R2, transistor Q2 and resistor R2, and Q3 in the controller 106 so that no effect is caused at the time of recording. For example, when increasing the resonance capacitance Ct to lower the head resonance frequency, the transistors Q1 through Q3 are turned on.

Operations of a transistor Q4 for controlling the increase in the above-mentioned feedback gain Ka (gain K2) and the transistor Q3 (Q1 to Q3) for controlling the increase in the above-mentioned resonance capacitance Ct (controlling the additional capacitance Cs) are on/off controlled by a mode control signal mc.

This mode control signal mc is a signal determined according to the formats of signals having different band characteristics in electromagnetic conversion. Namely, in the present embodiment, this mode control signal mc is determined according to whether a signal to be reproduced is a wide-band signal (digital signal) or a narrow-band signal (analog signal). The mode control signal mc is LOW (L) at the time of recording or reproduction of a wide-band signal and HIGH (H) at the time of recording or reproduction of a narrow-band signal.

For example, when the mode control signal mc goes LOW at the time of recording or reproducing a wide-band signal (digital signal), the transistors Q3 through Q1 and Q4 all turn off (open). On the other hand, when the mode control signal mc goes HIGH at the time of reproducing a narrow-band signal (analog signal), the transistors Q3 through Q1 and Q4 all turn on.

Thus, when the mode control signal mc goes HIGH, the transistors Q3 through Q1 turn on, lowering the head resonance frequency by the additional capacitance Cs of the resonance capacitance Ct. At the same time, the transistor Q4 turns on, lowering the voltage of the gain control signal gc to increase the feedback gain Ka. This corrects the amplitude phase characteristic to an optimum level.

The example of FIG. 6 is circuitry equivalent to one channel with the output of the head rotary system 103 unbalanced. It will be apparent that, in the case of a multi-channel configuration, each channel may also be configured as shown in FIG. 6.

Figure 7:
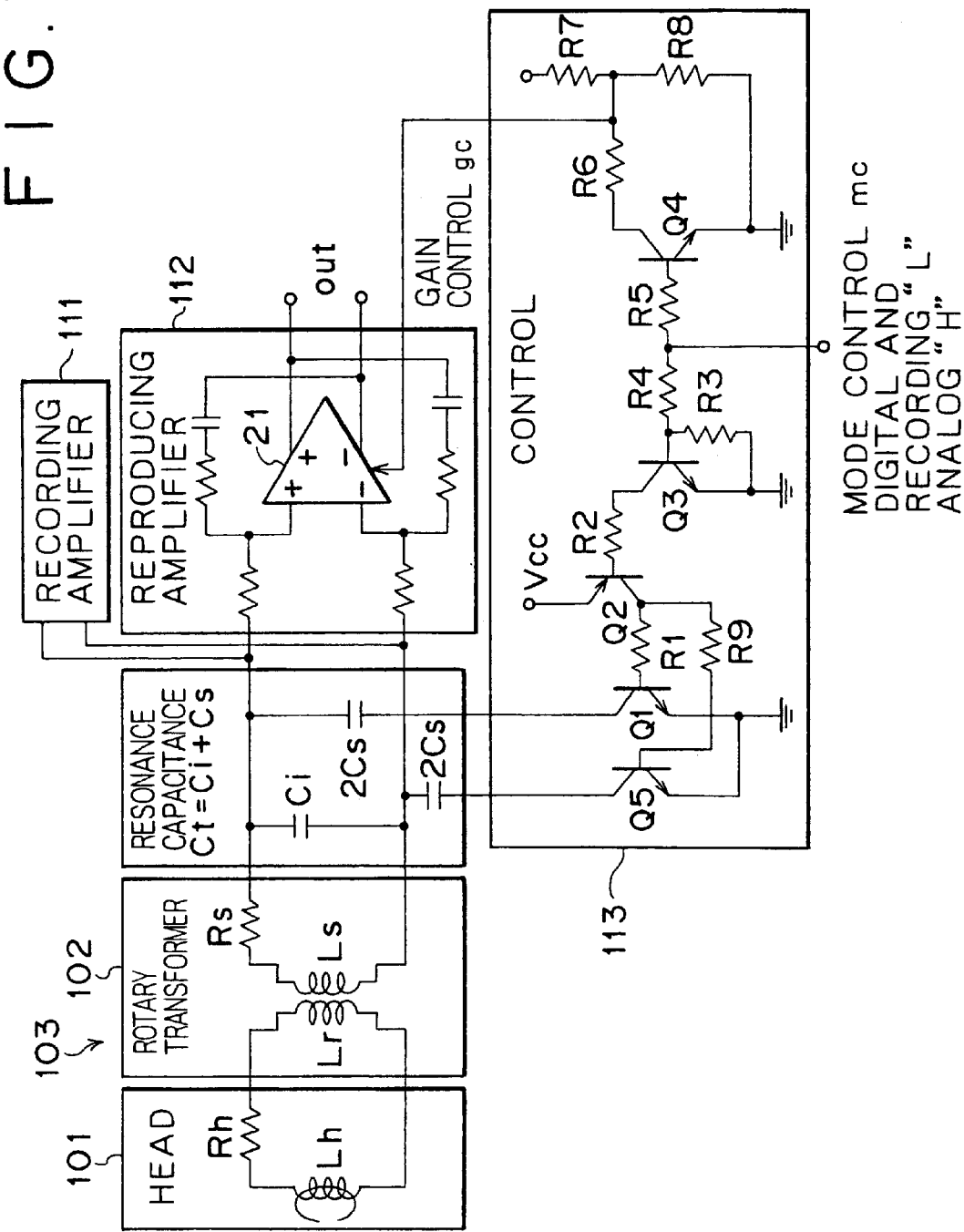
FIG. 7 is a circuit diagram illustrating one example of configuration equivalent to one channel with the output of the head rotary system balanced.

FIG. 7 shows an example of a circuit configuration equivalent to one channel with the output of the head rotary system 103 balanced. It should be noted that balanced input processing is generally resistant to the elimination of in-phase unnecessary signals. With reference to FIG. 7, components (or elements) similar to those previously described with FIGS. 5A, 5B, and 6 are denoted by the same reference numerals, description of the overlapping portions being skipped. In FIG. 7, a recording amplifier 111 is also illustrated, of which description will be skipped.

In order to execute balancing processing, the configurational example of FIG. 7 uses a differential amplifier 121 for the amplifier (the reproducing amplifier 112). The differential amplifier 121 is controlled in gain by a gain control signal gc which is similar to that shown in FIG. 6.

In the configurational example of FIG. 7, the additional capacitance constituting resonance capacitance Ct is 2Cs and two capacitors are used for this additional capacitance 2Cs. To control these additional capacitors 2Cs, a control transistor Q5 is added to the controller 113, thereby preventing balancing from being lost. These additional capacitors are equivalently the same as the additional capacitor shown in FIG. 6.

In the configuration shown in FIG. 7, the reproducing amplifier 112 is turned off at recording and mode control signal mc is turned LOW to turn off (open) the transistors Q1, Q5, and Q4 in the controller 113. This causes a recording operation by the recording amplifier 111. On the other hand, at the time of reproduction, the reproducing amplifier 112 is turned on and, at the time of reproducing a wide-band signal (digital signal) for example, the mode control signal mc is turned LOW to turn off the transistors Q1, Q5, and Q4 in the controller 113. At the time of reproducing a narrow-band signal (analog signal) for example, the mode control signal mc is turned HIGH to turn on the transistors Q1, Q5, and Q4 in the controller 113.

Thus, the C/N ratio at reproducing a narrow-band signal (analog signal, namely 8 mm video format in the present embodiment) is improved by use of a minimal additional circuit for the wide-band signal (digital signal) recording/reproducing system.

Figure 8:
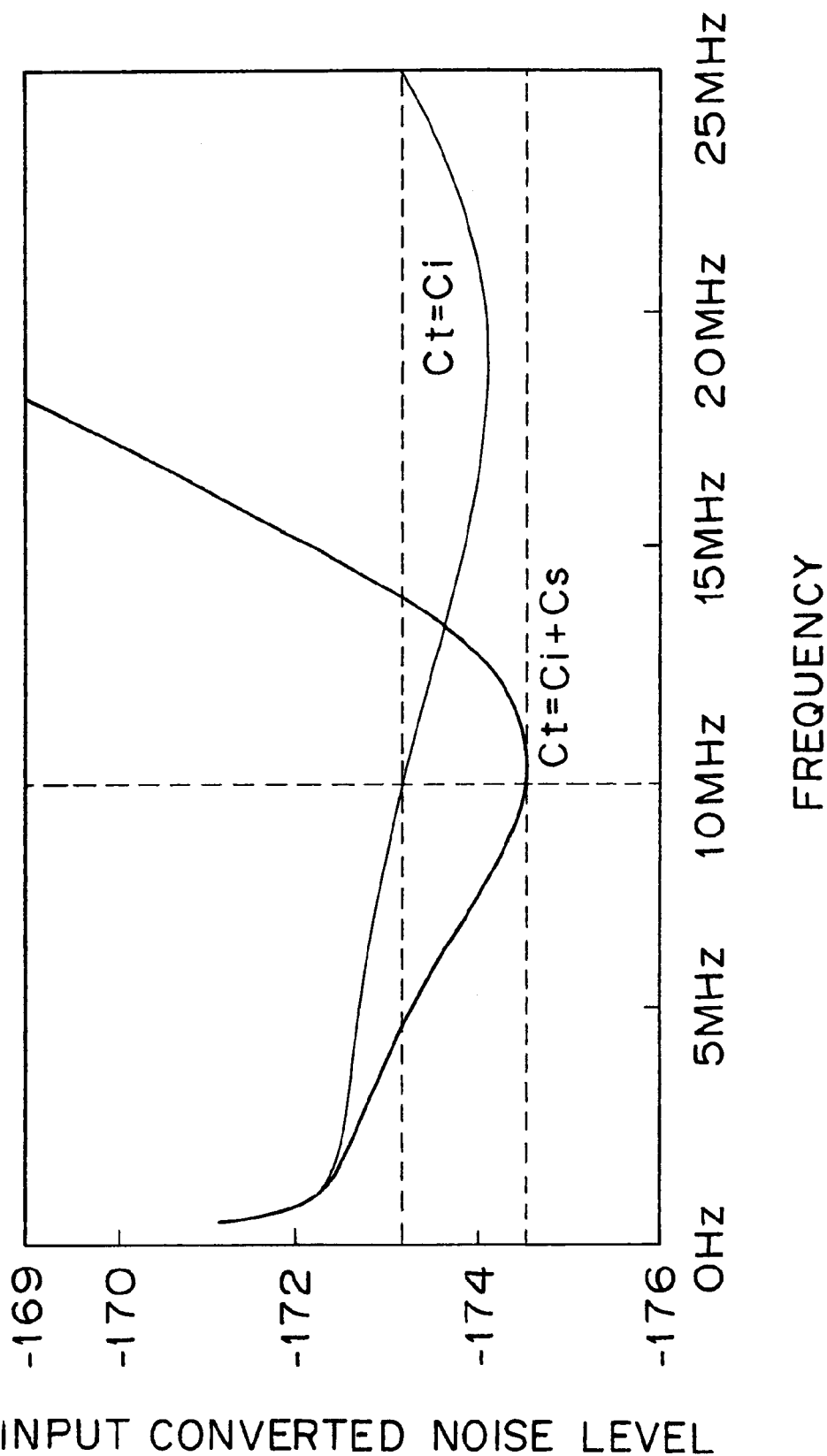
FIG. 8 is a diagram illustrating the signal reproduction characteristics in a magnetic recording/reproducing apparatus practiced as one preferred embodiment of the invention.

FIG. 8 shows the signal reproduction characteristics in the magnetic recording/reproducing apparatus practiced as the present embodiment. In FIG. 8, Rh=13, Rs=1, r=12, Ls=3.59 $\mu$H, Lh=1 $\mu$H, n=1.5, K=0.95, R=30 k, Ci=25 pF, and Cs=68 pF for example. Ct=Ci denotes the input converted noise dBm/$\sqrt{}$(Hz) at the reproduction of a wide-band signal and Ct=Ci+Cs denotes the input converted noise dBm/$\sqrt{}$(Hz) at the reproduction of a narrow-band signal.

FIG. 8 indicates the improvement of the C/N ratio in the neighborhood of 10 MHz by about 1.3 dB at the reproduction of a narrow-band signal according to the present embodiment.

In reproducing a wide-band signal (digital signal) and a narrow-band signal (analog signal) by a head rotary system for example, an attempt to realize this capability by a combination of a magnetic head dedicated to wide-band and narrow-band and a multi-channel rotary transformer significantly pushes up material and design costs, making it difficult to provide low-cost apparatus. According to the invention, however, a conventional so-called rotary transformer can be made wide band without adding a new channel. In addition, the C/N ratio of wide-band and narrow band transmission characteristics and the amplitude phase characteristic can be optimized only by switching of the externally added capacitance and the damping correcting feedback gains. These novel constitutions simplify the circuit configuration, prevent the adverse effects from being extended over the wide-band circuit, and reproduce a narrow-band signal (analog signal) by a simple and low-cost configuration as an upward-compatible capability in the recording/reproducing apparatus for wide-band signal (digital signals) for example.

While the preferred embodiments of the present invention have been described using specific terms, such description is for illustrative purposes only, and it is to be understood that changes and variations may be made without departing from the spirit or scope of the appended claims.

What is claimed is:

1. A recording format discriminating apparatus for use on a video tape recorder capable of reproducing a signal recorded on a recording medium in one of a digital recording format and an analog recording format by one of a same head rotary system and a plurality of head rotary systems dedicated to analog recording and digital recording respectively, comprising:

amplifying means, having a capability of automatically controlling a gain of a signal reproduced by one of the head rotary systems, for amplifying said signal to a predetermined level;

first band extracting means for extracting a particular narrow frequency band from the signal amplified by said amplifying means;

first comparing and detecting means for detecting by amplification an output of said first band extracting means and comparing the detected output with a first reference value;

second comparing and detecting means for integrating and holding the comparison result output of said first comparing and detecting means and then comparing the integrated output with a second reference value; and recording format discriminating means for discriminating the recording format of the signal recorded on the recording medium from the comparison result output of said second comparing and detecting means.

2. The recording format discriminating apparatus as claimed in claim 1, further comprising:

second band extracting means for extracting, from the signal reproduced by one of the head rotary systems, a particular frequency band which is wider than the band extracted by said first band extracting means and has a center frequency different from that of the band extracted by said first band extracting means;

third comparing and detecting means for amplifying the output of said second band extracting means for envelope detection and comparing the detected result with a third reference value;

fourth comparing and detecting means for integrating the comparison detection output of said third comparing and detecting means and comparing the integrated result with a fourth reference value;

reproduction output discriminating means for determining from the comparison result output of said fourth comparing and detecting means whether the signal reproduced by one of the head rotary systems has a reproduction output and whether the reproduction output has lowered in level; and hold control means for controlling the capability of holding the integrated result output of said second comparing and detecting means according to the comparison result output of said third comparing and detecting means.

3. The recording format discriminating apparatus as claimed in claim 1, further comprising:

band frequency switching means for switching between center frequencies of said first band extracting means according to drum rotation at digital reproduction and drum rotation at analog reproduction of one of the head rotary systems.

4. The recording format discriminating apparatus as claimed in claim 3, wherein the recording format is an 8-mm format, the extracted frequency band of said first band extracting means being 1 to 1.4 MHz at drum rotation of analog reproduction and the extracted frequency band of said first band extracting means being 2.5 to 3.5 MHz at drum rotation of digital reproduction.

5. The recording format discriminating apparatus as claimed in claim 1, wherein the recording format is 8 mm format and an identification code recognizing means is provided for recognizing an identification code on the digital recording format in drum rotation at digital reproduction, recording format discrimination is made from the recognition result of said identification code recognizing means in drum rotation at digital reproduction, the extracted frequency band of said first band extracting means is 1 to 1.4 MHz in drum rotation at analog reproduction, and recording format discrimination is made from the comparison result output of said second comparing and detecting means.

6. The recording format discriminating apparatus as claimed in claim 2, wherein the recording format is 8 mm format and said second band extracting means sufficiently includes 3.75 to 4.5 MHz.

7. A recording format discriminating method for use on a video tape recorder capable of reproducing a signal recorded on a recording medium in one of a digital recording format and an analog recording format by one of a same head rotary system and a plurality of head rotary systems dedicated to analog recording and digital recording respectively, comprising:

amplifying step, having a capability of automatically controlling a gain of a signal reproduced by one of the head rotary systems, for amplifying said signal to a predetermined level;

first band extracting step for extracting a particular narrow frequency band from the signal amplified by said amplifying step;

first comparing and detecting step for detecting by amplification an output of said first band extracting step and comparing the detected output with a first reference value;

second comparing and detecting step for integrating and holding the comparison result output of said first comparing and detecting step and then comparing the integrated output with a second reference value; and recording format discriminating step for discriminating the recording format of the signal recorded on the recording medium from the comparison result output of said second comparing and detecting step.

8. The recording format discriminating method as claimed in claim 7, further comprising:

second band extracting step for extracting, from the signal reproduced by one of the head rotary systems, a particular frequency band which is wider than the band extracted by said first band extracting step and has a center frequency different from that of the band extracted by said first band extracting step;

third comparing and detecting step for amplifying the output of said second band extracting step for envelope detection and comparing the detected result with a third reference value;

fourth comparing and detecting step for integrating the comparison detection output of said third comparing and detecting step and comparing the integrated result with a fourth reference value;

reproduction output discriminating step for determining from the comparison result output of said fourth comparing and detecting step whether the signal reproduced by one of the head rotary systems has a reproduction output and whether the reproduction output has lowered in level; and hold control step for controlling the capability of holding the integrated result output of said second comparing and detecting step according to the comparison result output of said third comparing and detecting step.

9. The recording format discriminating method as claimed in claim 7, further comprising:

band frequency switching step for switching between center frequencies of said first band extracting step according to drum rotation at digital reproduction and drum rotation at analog reproduction of one of the head rotary systems.

10. The recording format discriminating method as claimed in claim 9, wherein the recording format is an 8-mm format, the extracted frequency band of said first band extracting step being 1 to 1.4 MHz at drum rotation of analog reproduction and the extracted frequency band of said first band extracting step being 2.5 to 3.5 MHz at drum rotation of digital reproduction.

11. The recording format discriminating method as claimed in claim 7, wherein the recording format is 8 mm format and an identification code recognizing step is provided for recognizing an identification code on the digital recording format in drum rotation at digital reproduction, recording format discrimination is made from the recognition result of said identification code recognizing step in drum rotation at digital reproduction, the extracted frequency band of said first band extracting step is 1 to 1.4 MHz in drum rotation at analog reproduction, and recording format discrimination is made from the comparison result output of said second comparing and detecting step.

12. The recording format discriminating method as claimed in claim 8, wherein the recording format is 8 mm format and said second band extracting step sufficiently includes 3.75 to 4.5 MHz.

13. A signal reproducing apparatus for at least reproducing signals having different band characteristics in electromagnetic conversion from a magnetic recording medium by use of a same magnetic head and a same rotary transformer, wherein a resonance frequency determined by an equivalent inductance and a resonance capacitance of said magnetic head and said rotary transformer is subjected to one of variation and switching according to formats of signals having different band characteristics in electromagnetic conversion.

14. The signal reproducing apparatus as claimed in claim 13, wherein an additional capacitance included in said resonance capacitance is subjected to one of variation and switching according to formats of said signals having different band characteristics in electromagnetic conversion.

15. The signal reproducing apparatus as claimed in claim 13, wherein a signal amplitude and a signal phase obtained after one of the resonance signal variation and the resonance signal switching are optimized by subjecting a feedback gain of feedback damping to one of variation and switching.

16. A signal reproducing apparatus for at least reproducing signals having different band characteristics in electromagnetic conversion from a magnetic recording medium by use of a magnetic head and a rotary transformer, comprising:

resonance frequency changing means for subjecting a resonance frequency determined by an equivalent inductance and a resonance capacitance of said magnetic head and said rotary transformer to one of variation and switching according to formats of said signals having different band characteristics in electromagnetic conversion.

17. The signal reproducing apparatus as claimed in claim 16, wherein said resonance frequency changing means subjects an additional capacitance included in said resonance capacitance to one of variation and switching according to the formats of the signals having different band characteristics in electromagnetic conversion to execute the subjection of said resonance frequency to one of variation and switching.

18. The signal reproducing apparatus as claimed in claim 16, further comprising:

optimizing means for optimizing a signal amplitude and a signal phase obtained after the subjection of said resonance frequency to one of variation and switching by subjecting a feedback gain of feedback damping to one of variation and switching.

* * * * *